United States Patent
Johnson et al.

(10) Patent No.: US 6,301,582 B1
(45) Date of Patent: Oct. 9, 2001

(54) SYSTEM AND METHOD FOR STORAGE OF SHARED PERSISTENT OBJECTS

(75) Inventors: Maynard Paul Johnson; Steven Jay Munroe; John Gerard Nistler; James W. Stopyro, all of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/050,821

(22) Filed: Mar. 30, 1998

(51) Int. Cl.[7] .................................................. G06F 17/00

(52) U.S. Cl. ............................ 707/103; 707/8; 707/100; 707/102

(58) Field of Search .................................. 707/8, 100, 103, 707/102; 711/150, 202; 395/701, 708, 316; 709/316

(56) References Cited

U.S. PATENT DOCUMENTS

| | | | |
|---|---|---|---|
| 5,590,326 | * 12/1996 | Manabe | 711/150 |
| 5,734,902 | * 3/1998 | Atkins et al. | 709/316 |
| 5,752,249 | * 5/1998 | Macon, Jr. et al. | 707/103 |
| 5,764,979 | * 6/1998 | Blackman et al. | 707/102 |
| 5,875,487 | * 2/1999 | Schwartz et al. | 711/202 |
| 5,943,497 | * 8/1999 | Bohrer et al. | 395/701 |
| 6,009,266 | * 12/1999 | Brownell et al. | 395/683 |
| 6,016,495 | * 1/2000 | McKeehan et al. | 707/103 |
| 6,032,153 | * 2/2000 | Sadiq et al. | 707/103 |
| 6,052,528 | * 4/2000 | Dehamboux | 395/708 |

OTHER PUBLICATIONS

Judge et al., "Sharing Objects in a Distributed Systems", IEEE 1993, pp. 136–140.*

Irlenbusch et al., "Towards a Resilient Shared Memory Concept for Distributed Persistent Object Systems", IEEE 1995, pp. 675–684.*

Inohara et al., "Page–Based Optimistic Concurrency Control for Memory–Mapped Persistent Object Systems", IEEE 1995, pp. 645–654.*

Jiang et al., "Integrating Parallel Functions into the Malipulation for Distributed Persistent Objects", IEEE 1996, pp. 76–82.*

"Java(TM) Persistence via Persistent Virtual Storage" by Johnsn et al., Jul. 7, 1997, pp. 1–16.

* cited by examiner

Primary Examiner—Wayne Amsbury
Assistant Examiner—Thuy Pardo
(74) Attorney, Agent, or Firm—S. Jared Pitts; Schmeiser, Olsen & Watts, LLP

(57) ABSTRACT

The preferred embodiment of the present invention facilitates the creation, storage and interaction of persistent objects using single level storage semantics on commodity systems. The preferred method and apparatus utilize a persistence mechanism to provide object persistence. In particular, the persistence mechanism defines a Factory class, a Finder class, an ExpandingContainer class, a Container class and a ClassLoader class which work together to create persistent shared objects. An application can create persistent objects by calling methods on the Factory class. The Factory class then works in conjunction with an instance of the Container class and the ClassLoader class to create persistent objects in a shared address space (SAS). Shared address space is a persistent virtual address space shared by all processes running on a computer system. The SAS allows the processes to access data within SAS at any time, using a SAS address.

69 Claims, 5 Drawing Sheets

Finder Class findObjectbyName (String name)
findNameByObjectID (Object obj)
insertObjectByName (String name, Object obj)
removeObjectByName (String name)
removeObjectbyID(Object obj)

FIG. 5

SYSTEM AND METHOD FOR STORAGE OF SHARED PERSISTENT OBJECTS

RELATED APPLICATIONS

This application is related to the following U.S. patent applications: "Virtual Machine Implementation for Shared Persistent objects", Ser. No. 09/050,832, filed on Mar. 30, 1998, now pending; "Method and Apparatus for Shared Persistent Virtual Storage on Existing Operating Systems", Ser. No. 09/050,830, filed on Mar. 30, 1998, now pending; and "Method and Apparatus for Encapsulating Address Translation for Shared Persistent Virtual Storage", Ser. No. 09/050,831, filed on Mar. 30, 1998, now pending, that are hereby incorporated by reference.

BACKGROUND OF THE INVENTION

1. Technical Field

The present invention relates in general to object-oriented computer systems. More specifically, the present invention relates to the field of persistence in object-oriented systems.

2. Background Art

The development of the EDVAC computer system of 1948 is often cited as the beginning of the computer era. Since that time, computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users to communicate with each other.

Computer systems typically include operating system software that controls the basic function of the computer, and one or more software applications that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software applications designed for high performance computer systems have become extremely powerful.

Object-oriented programming based on an object model is a new way of creating computer programs that has become very popular over the past several years. The goal of using object-oriented programming is to create small, reusable sections of program code known as objects that can be quickly and easily combined and re-used to create new programs. By creating and re-using a group of well-tested objects, a more stable, uniform, and consistent approach to developing new computer programs can be achieved.

One issue in object oriented programming is object persistence. Typically, when a process ends, all of the references to objects created by the process are lost, and the objects themselves are destroyed. These objects are referred to as transient objects. Persistent objects, as opposed to transient objects, have a lifetime that transcends the lifetime of the process that created them. To make an object persistent, mechanisms must be put in place to allow a persistent object to survive beyond the lifetime of the process from which the object was created so that other processes can access the object. This typically involves the storing of the objects onto permanent storage devices, such as hard disks, optical disks, tape drives, etc.

Many common computer systems use an addressing scheme referred to as the two level storage (TLS) model for storing persistent objects. The TLS model stores and manipulates data using two systems: a file manager and a virtual memory system. The virtual memory includes the actual memory and a specialized data file called a swap file. The virtual memory system controls the allocation of address space to different processes. The file manager stores and retrieves data from the permanent storage devices in the form of files.

One benefit to using the TLS model is that it provides large amounts of address space to fixed size address machines. This large address space is useful for storing large amounts of information. However, the TLS models does not provide a way for storing persistent objects in a way that can be efficiently used by a computer system.

In particular, in a TLS system persistent data, such as persistent objects, must be stored in files on a disk or other storage medium by the file manager. When a process needs to access a persistent object, the process must contact the file manager which locates the persistent object in a file on backing store and move a copy of the persistent object data into a memory buffer. The persistent object data must then be reconstructed into a persistent object in memory.

When the data being stored by the TLS model is persistent, several other problems are introduced. For example, persistent objects typically contain many pointers used for sharing data and methods with other objects. When a persistent object is retrieved from backing store and a new runtime representation of the object is created, any internal pointers contained within the persistent object must be converted and rebuilt. Rebuilding persistent objects, and more specifically, converting pointer references contained within persistent objects results in significant overhead on the CPU.

Some TLS systems use externalization techniques to store persistent objects. These techniques pull data from the object and write the externalized data to a data file. When the object is needed again, the data must be read in by the file system and the persistent object recreated using state data. This processes requires reading from the file system to a memory buffer, and copying data from the memory buffer to the object. This also creates significant unwanted CPU overhead.

Another addressing scheme is the single level storage (SLS) model. The SLS system maps all of the storage mediums, including persistent storage mediums such as hard drives, into a single address space. This makes the entire data storage system into a single "virtual memory" that is accessed directly using a single, process independent, address space. In an SLS system, persistent data from the permanent storage mediums can be easily copied to real memory using the virtual memory addressing.

The SLS model is very efficient means of making and manipulating persistent objects because it reduces the amount of system overhead to load persistent objects into memory. As mentioned, when a process needs a persistent object, the persistent object is copied from persistent storage and into real memory. This involves creating only one copy rather than the two copies created by the TLS model. Because pointer references are processes independent, SLS system allows persistent objects, including pointer references contained within persistent objects, to be moved into and from persistent storage without requiring any rebuilding of the persistent object. When a process needs to access a persistent object, the SLS model simply moves this object from the backing store into memory. Stated another way, the SLS model eliminates the need to create a runtime representation of a persistent object since pointer references contained within the persistent object always remain valid. Another advantage to SLS systems is that pointers to objects are process independent. This allows easy sharing of persistent objects between multiple processes.

The SLS model has been successfully implemented using 48 and 64 bit memory addresses since 1980 (IBM System/38 and AS/400). However, many business applications today run on desktop PC's which have 32 bit memory addresses. Because a SLS system maps all data storage into a single virtual memory, a very large address space is required. A 32 bit SLS system would simply not be large enough to store the enormous amounts of data generated by large business applications. Thus, programmers and computer users of commodity 32-bit systems continue to have no easy way to store objects persistently.

Without a more effective method for providing persistent storage to 32 bit address systems, the computer industry will never fully realize the benefits of object oriented programming.

DISCLOSURE OF THE INVENTION

According to the present invention, a method and apparatus for creating shared persistent objects is provided. The preferred method and apparatus utilize a persistence mechanism to provide object persistence. In particular, the persistence mechanism defines a Factory class, a Finder class, an ExpandingContainer class, a Container class and a ClassLoader class which work together to create persistent shared objects. An application can create persistent objects by calling methods on the Factory class. The Factory class then works in conjunction with an instance of the Container class and the ClassLoader class to create persistent objects in a shared address space (SAS). Shared address space is a persistent virtual address space shared by all processes running on a computer system. The SAS allows the processes to access data within SAS at any time, using a SAS address.

The foregoing and other features and advantages of the present invention will be apparent from the following more particular description of the preferred embodiment of the invention, as illustrated in the accompanying drawings.

BRIEF DESCRIPTION OF THE DRAWINGS

FIG. 5 illustrates the methods defined for the Finder class.

BEST MODE FOR CARRYING OUT THE INVENTION

Figure 1:
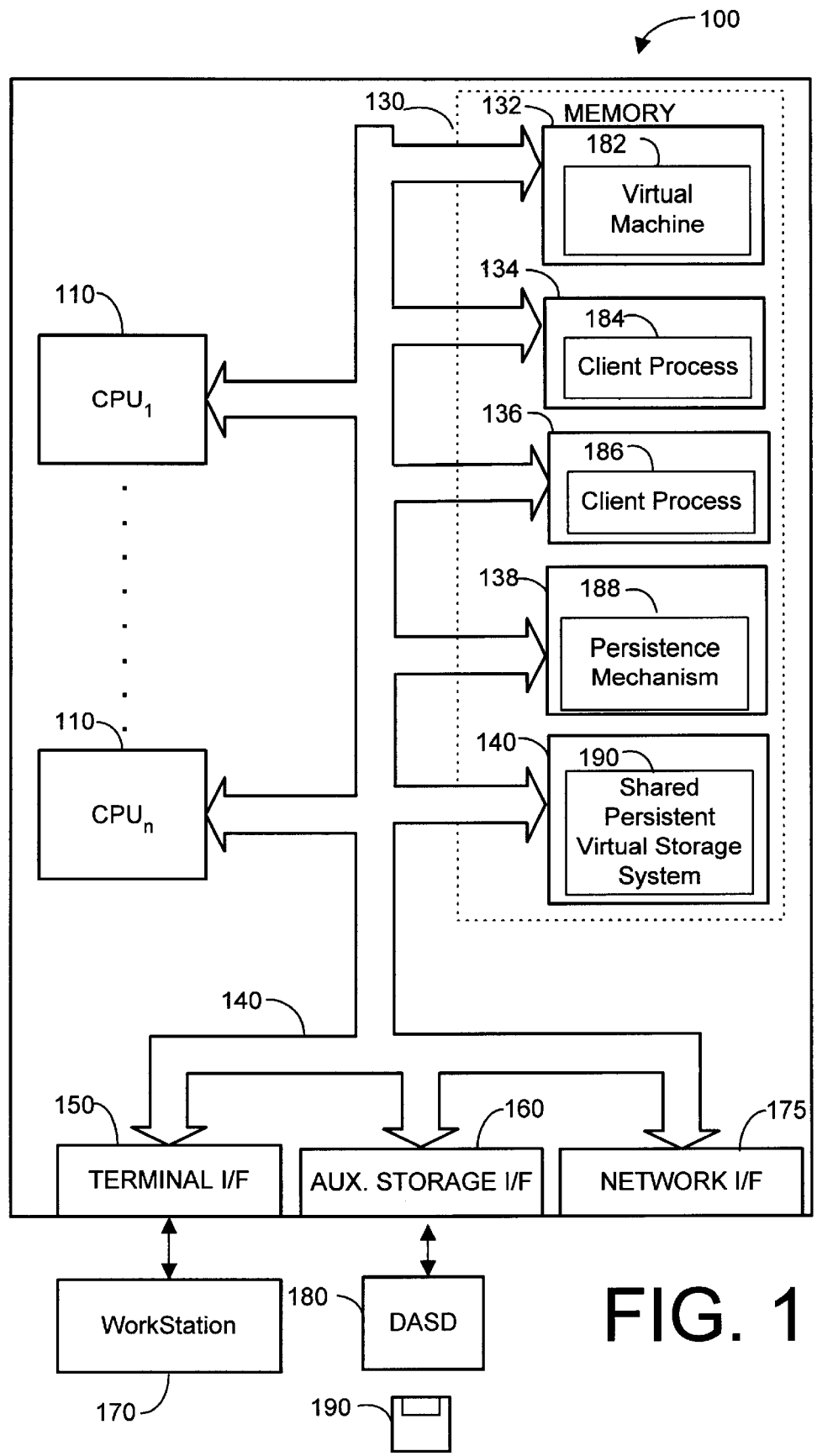
FIG. 1 is a schematic view of a computer system in accordance with a preferred embodiment of the present invention.

A method and apparatus for providing object persistence in an operating environment is provided. The preferred embodiment includes a generic Factory class that defines the methods needed to provide shared persistence in the Java environment. Applications can call methods on the Factory class to create shared persistent objects. An overview of Object-Oriented Technology and the Java Programming Language will now be provided, followed by a detailed description of the preferred embodiments.

1. Overview

Object-Oriented Technology v. Procedural Technology

Object oriented programming based on an object model is a new way of computer programming that has become very popular over the past several years. Computer programs written in object-oriented languages are known as object-oriented programs. Object-oriented programming uses objects as fundamental building blocks whereas procedural programming is based upon procedures. This difference stems from the fact that the design focus of object-oriented programming technology is wholly different than that of procedural programming technology. The focus of procedural-based design is on the overall process that solves the problem; whereas, the focus of object-oriented design is on how the problem can be broken down into a set of autonomous entities that can work together to provide a solution. The autonomous entities of object-oriented technology are, of course, objects.

Conceptually, an object has two parts, an external object interface and internal object data. Internal data is encapsulated by the object interface such that other objects must communicate with that object through its interface. Thus, the only way to retrieve, process or otherwise operate on the encapsulated data is through methods defined on the object. This protects the internal portion of the object from outside tampering. Additionally, because outside objects have no access to the internal implementation, that internal implementation can change without affecting other aspects of the program. The object system thus isolates the requestor of services (clients) from the providers of services by a well defined encapsulating interface.

Data in an object is operated upon by calling a "method" on the object. In the object model, a client object sends a call to the server object system. The call identifies a particular object and specifies what method is to be performed by the object, and provides any parameters required. The object interprets the message to decide what service to perform, and returns back any data that results.

Because all operations on an object are expressed as calls from one object to another, methods can be called by remote objects. Objects that reside in different locations that communicate with each other across a network are called distributed objects in a distributed object system.

Another central concept in object-oriented programming is the class. A class is a template that defines a type of object. A class is defined by a set of class parameters that specify the details of objects that belong to its class. By defining a class, objects can be created that belong to the class without having to rewrite the entire definition. This promotes the reusability of existing definitions and promotes efficient use of program code.

There are many computer languages that support object-oriented programming. For example, Smalltalk, Object Pascal, C++ and Java are all programming languages that to one degree or another support object-oriented programming. Any of these and others can be used to write programs that use objects.

One issue in object oriented programming is object persistence. Persistent objects, as opposed to transient objects, have a lifetime that transcends the lifetime of the program that created them. To make an object persistent, mechanisms must be put in place to allow the object to survive the process that creates it so that other processes can access the object at any point in time.

One common approach to providing persistence is the use of a use a persistent mixin class of objects. In this approach all objects for which persistence is desired must have this persistent mixin class as a superclass somewhere in their class's inheritance lattice. Because a mixin class is required in the inheritance lattice, this method of providing object persistence cannot be used to provide persistence in a way that is orthogonal (i.e., independent) to the class of the object. Because the object persistence is not orthogonal to class, the applications in which it can be used are limited.

Another approach which provides object persistence is "externalization". Externalization is the means or protocol used in object-oriented programming for transferring data out of an object. In essence the "state data" that defines the attributes of an object are "externalized", or written out of the object, into a different format that is easily stored in the local data store. When the object is needed again, the externalized state data is internalized into an object, creating an exact copy of the object as it previously existed. Additionally, any pointers in the persistent objects must be accounted for during externalization. This requires converting the pointer to an object "name" for storage, and then turning it back when the externalized object is recreated. All these process required for externalizing the state data for storage, dealing with internal pointers, and then internalizing it again when needed takes an excessive amount of processing time and thus slows performance in a way that can be unacceptable in many applications.

When persistence of an object is independent of its class or type, the persistence is said to be orthogonal to class. With an orthogonal persistence system, any object of any class can be made persistent. Thus, no special "persistence object base class" with special methods is required to be in the objects superclass lattice for the object to be persistent. Furthermore, all the procedures and methods defined by the superclass lattice are available on each object regardless of whether that object is persistent or transient.

Memory and File Systems

Modern computers use a variety of methods to manage, access and store data in computer systems. Computer systems typically contain two main types of data storage, transient data storage such as DRAM, and persistent storage such as hard disk drives, optical drives and such. Several systems exist for managing the flow of information between these storage mediums and the processors that execute the programs.

Most commodity computer systems today, such as IBM compatible personal computers running IBM's OS/2 or Microsoft's Windows, use a system called two-level store (TLS). TLS systems use a file system for storing data on permanent storage and a virtual memory system for running application processes. Included in the virtual memory system of TLS systems is a specialized data file called a swap file. The swap file is used as "extra memory" to store data for application processes that are too large to be loaded into the limited amount of "real memory".

In TLS systems a file manager keeps a directory that relates the name of a file to the location on the disk where the data for the file is stored. The file manager provides an interface to allow programs to "read" a file. The data from the file is then copied into memory, which include the real memory and the swap file. There, the data can be used and manipulated. When the program is finished with the data, a "write" operation is performed, which causes the data to be moved from the virtual memory back to the file on the disk.

In most TLS virtual memory systems, each application process is assigned its own virtual address space. For example, when the central computer creates a first process, the underlying operating system allocates a virtual address space for use by this process only. As the process executes the operating system will allocate real memory chunks for usage by the process. As each real chunk is allocated, the operating system will also create a mapping of the process virtual addresses to real memory. This procedure would be repeated for other application processes running on the same computer. As the real memory becomes overcommited, the contents of the real memory can be temporarily moved to the swap file and the real memory portion reused by other processes.

When an application processes is started, the data for the application must first be moved from its permanent storage file to the virtual memory system. This typically involves copying a portion of the application into real memory and a portion of the application into the swap file. The application then runs from the real memory, using its virtual addressing while the operating system moves portions of the application between real memory and the swap file as needed.

This system does have its advantages. For example, because the operating system hides the complexity of real memory system and swap file from the application, it is easier to write applications. Second, it isolates each process from all others so that bugs in one processes do not usually cause bugs in other processes.

The system unfortunately also has several disadvantages. One of these is the context dependent nature of the virtual addresses. Because each application uses a virtual address range that has no meaning to other applications, addresses cannot be easily shared between applications. For example, only the first application process could access its allocated chunk of memory, but cannot access data in a second chunk of memory which belongs to the second process.

This context dependency is especially troubling for persistent objects, which by definition can outlive the application processes which created them. Persistent objects typically contain address pointers which reference valid information when created. However, as mentioned, the TLS model creates memory for each process and destroys the memory when the process is eliminated. Therefore, when a persistent object is created, the pointers contained within the object remain valid only as long as the application which created the persistent object is in memory. Once the persistent object is saved onto backing store, the meaning of the pointers within the object are lost.

In order to avoid this problem, externalization techniques are required to convert the pointer to an object "name" when storing the persistent object. When the persistent object is retrieved from backing store and a new runtime representation of the object is created, the object name must be converted to a new valid pointer. This process of creating a new runtime copy of the persistent objects and converting pointer references contained within persistent objects is very inefficient and results in significant overhead on the CPU.

The single level storage (SLS) model was developed in response to the memory management problems described above. The SLS system maps all of the data storage mediums, generically referred to as backing store, into a single large address space. The backing store can include any type of local storage medium, such as magnetic and optical disk drives, and can also include the storage mediums of multiple computer systems connected by large networks. In the SLS model each byte of data contained within this large backing store area is addressed using its own unique, context independent virtual address. This makes the entire storage system function as a single "virtual memory" with a context independent addressing scheme.

The SLS model is very efficient means of making and manipulating persistent objects because it reduces the amount of system overhead to store and retrieve persistent objects from backing store. In an SLS system, persistent objects, including pointers to other objects contained within the persistent object, can be stored in backing store without modification.

This is allowed because pointers stored in persistent objects in an SLS system are context independent. Because all applications share the same large virtual address space, all pointers to objects remain valid regardless of their context. This eliminates the need for converting pointer references to "names" when storing persistent objects.

Thus, no separate steps are required to store persistent objects to backing store, such as those required to externalize object data in TLS systems. Likewise, no separate steps are needed to retrieve persistent objects from backing store. When a persistent object is needed from backing store, the persistent object can be simply copied from backing store into a memory buffer, with no recreation required. Thus, SLS systems eliminate the need to create different runtime and storage versions of persistent objects. Because persistent objects can be simply copied from backing store to/from memory as needed, processor overhead in dealing with persistent objects is significantly reduced.

Furthermore, because all address pointers are context independent, they can be easily shared between processes. In contrast, the context dependent pointers of TLS cannot be shared The SLS model has been successfully implemented using 48 and 64 bit memory addresses since 1980 (IBM System/38 and AS/400). However, many business applications today run on desktop PC's which have 32 bit memory addresses. Because a SLS system maps all data storage into a single virtual memory, a very large address space is required. A 32 bit SLS system would simply not be large enough to store the enormous amounts of data generated by large business applications. Thus, programmers and computer users of commodity 32-bit systems continue to have no easy way to provide object persistence.

Java Programming Language

Java is a modern object oriented programming language specially designed to create distributed object systems. Many features and advantages makes Java a desirable programming language to use. For example, Java is specifically designed to create small programs, commonly called applets, that can reside on a network in centralized servers, and delivered to a client machine only when needed. Another feature of Java is that Java is an interpreted language and thus is completely platform independent. A Java program can be written once and run on any type of platform that contains a Java Virtual Machine (JVM). Finally, Java is an object oriented language, meaning that software written in Java can take advantage of the benefits of object oriented programming.

A Java compiler compiles programs written in Java into bytecodes which are platform independent commands that can be interpreted and run by a JVM. The JVM is a virtual computer that must be implemented for each platform on which the Java program must be run. The JVM provides a layer of abstraction between the compiled bytecodes and the underlying hardware platform and operating system that allows Java code to be portable from one platform to another.

Java bytecodes include two parts, a one-byte opcode, which is a specific and recognizable command, and zero or more operands which contain the data needed to complete the opcode. When the JVM executes a program it takes the java bytecodes and interprets or converts them to machine code instructions for the underlying hardware, and passes the machine code instructions to the CPU for execution. By working in such a manner, Java programs can be written once and run on any platform for which a JVM is available.

As the use of the Java programming language increases, the need for an efficient persistent object mechanism that provides orthogonal persistence to Java objects on 32 bit commodity processors becomes greater. Without a mechanism that can be used to provide efficient orthogonal persistence to Java objects in a Java programming environment on 32 bit systems, the computer industry will never fully realize the potential of the Java language. The remainder of this specification discloses the preferred method and apparatus for providing orthogonal persistence to Java objects on 32 bit systems using single level store (SLS) semantics.

2. Detailed Description

Referring now to FIG. 1, a computer system 100 in accordance with a preferred embodiment of the present invention includes: a plurality of Central Processing Units (CPUs) 110; a terminal interface 150; an auxiliary storage interface 160; a workstation 170; a Direct Access Storage Device (DASD) 180; a bus 140; and a memory 130 which includes multiple locations for containing various software programs. In this example, memory 130 includes a Virtual Machine 182 (VM) running in location 132, a first client process 184 residing in location 134, a second client process 186 running in location 136, a Persistence mechanism 188 residing in location 138 and a Shared Persistent Virtual Storage system 190 running in location 140.

Persistence mechanism 188 and Shared Persistent Virtual Storage system 190 work in conjunction to provide persistent storage to data generated by client process 184 and client process 186. Specifically, Persistence mechanism 188 defines a Factory class, a Container class, an Expanding Container class, a Class Loader class and a Finder class which contain methods needed to create and store persistent objects. Client process 1 and Client process 2 can call methods on Factory class to create and store persistent objects. Factory class then works in conjunction with an instance of the Container class, the Expanding Container class, the Class Loader class and the Finder class to create persistent objects. Persistence mechanism 188 then works in conjunction with shared persistent virtual storage system 190 to allocate persistent storage for objects.

Virtual Machine 182 allows the running of interpreted language programs on the computer system 100. As such, virtual machine 182 can be any type of virtual machine, such as a Java Virtual Machine.

CPUs 110 perform computation and control functions of system 100. All CPUs associated with system 100 may each individually comprise a single integrated circuit, such as a microprocessor, or may comprise any suitable number of integrated circuit devices and/or circuit boards working in cooperation to accomplish the functions of a central processing unit. All CPUs are capable of suitably executing the programs contained within memory 130 and acting in response to those programs or other activities that may occur in system 100.

Memory 130 is any type of memory known to those skilled in the art. This would include Dynamic Random Access Memory (DRAM), Static RAM (SRAM), flash memory, cache memory, etc. While not explicitly shown in FIG. 1, memory 130 may be a single type of memory component or may be composed of many different types of memory components. For example, memory 130 and CPUs 110 may be distributed across several different computers that collectively comprise system 100. For example, Java Virtual Machine 182 may reside on one computer with $CPU_1$ and persistence storage system 1 186 may reside on another computer system with a separate $CPU_2$. Computer system 100 of FIG. 1 simply illustrates many of the salient features of the invention, without limitation regarding the physical location of CPUs 110 or memory locations within memory 130.

Bus 140 serves to transmit programs, data, status and other forms of information or signals between the various components of system 100. The preferred embodiment for bus 140 is any suitable physical or logical means of connecting computer systems and components known to those skilled in the art. This includes, but is not limited to, direct hard-wired connections, fiber optics, infrared (IR) and other forms of wireless connections. It is anticipated that many alternative methods and materials for connecting computer systems and components will be readily adapted for use with the present invention. This would include those methods and materials not presently known but developed in the future.

Terminal interface 150 allows human users to communicate with system 100, normally through a workstation 170. Workstation 170 is preferably a computer system such as an IBM compatible personal computer. Although system 100 as depicted in FIG. 1 contains only a single workstation 170, it should be understood that the actual number of workstations attached to system 100 will be a function of system design and user preference. Workstation 170 may also be a dumb terminal or other non-programmable computer input/output device which allows human interaction with computer system 100.

Auxiliary storage interface 160 represents any method of interfacing a storage apparatus to a computer system known to those skilled in the art. Auxiliary storage interface 160 allows auxiliary storage devices such as DASD 180 to be attached to and communicate with the other components of system 100. While only one auxiliary storage interface 160 is shown, the present invention anticipates multiple interfaces and multiple auxiliary storage devices such as DASD 180. For example, DASD 180 may be a floppy disk drive which is capable of reading and writing programs or data on a floppy disk. DASD 180 may also be any other type of DASD known to those skilled in the art. This would include CD-ROM drives, hard disk drives, optical drives, etc.

Network interface 175 is used to connect other computer systems and/or workstations to computer system 100 in networked fashion. In the preferred embodiment the network interface 175 provides a connection to the Internet and the World-Wide-Web, but could also be to connect to other networked environments, such as internal web-based systems (typically called Intranets). The present invention applies equally no matter how computer system 100 may be connected to other computer systems and/or workstations, regardless of whether the connection is made using present-day analog and/or digital techniques or via some networking mechanism of the future.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of a particular type of signal bearing media used to actually carry out the distribution. Examples of signal bearing media include: recordable type media such as floppy disks 190, CD-ROMs and transmission type media such as digital and analog communication links.

Client process 184 and client process 186 are simply applications running on a local machine. Like most applications, these applications need to retrieve and store data frequently. It should be assumed for purposes of demonstrating the present invention that client process 184 and/or client process 186 running on computer system 100 may wish to store data persistently. That is, client process 184 and client process 186 may have data which must exist after the processes themselves have been removed from memory 130. In order to store data persistently, mechanisms must be put in place which allow the data to exist beyond the lifetime of the process which created it.

Figure 2:
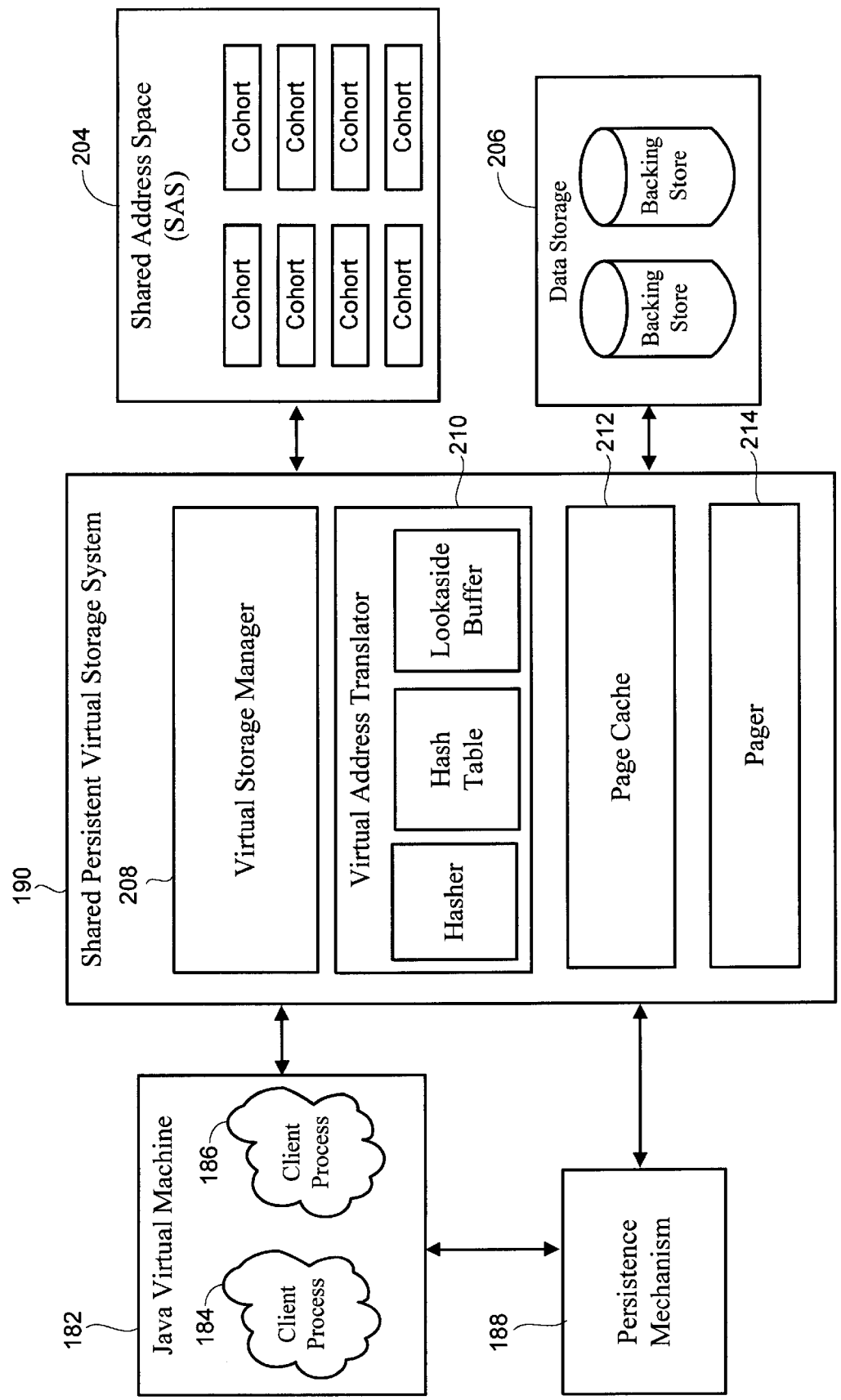
FIG. 2 is a functional block diagram illustrating a Persistence Mechanism residing on a local machine in accordance with the preferred embodiment.

Now referring to FIG. 2, client process 184, client process 186, shared persistent virtual storage system 190, Persistence Mechanism 188 and VM 182 are shown in more detail. Also shown in FIG. 2 is a shared address space (SAS) 204 and a data storage 206. The shared persistent virtual storage system 190 manages the large shared address space (SAS) 204, performs address translations as necessary, and controls the retrieval and storage of SAS data in data storage 206. In accordance with the preferred embodiment, the shared persistent virtual storage system 190 includes a virtual storage manager 208, a virtual address translator 210, a page cache 212, and a pager 214. The virtual storage manager 208 allocates and deallocates portions of the SAS 204 to portions of the data storage 206 as needed. The virtual address translator 210 translates 128 bit SAS addresses to native addresses of the data in the page cache when requested by client objects. The pager 214 moves pages of data between data storage 206 and page cache 212 as needed by client objects.

It should be understood that in this application the term shared address space refers to the large address space that allows applications to store persistent data using single level store semantics. Likewise, the term native address as used in this application refers to an address that can be used by the underlying system to retrieve data from the page cache. As such, the native address is typically a 32 bit virtual address as used in the two level store of the underlying system. Of course, the underlying system is not required to use 32 bit addressing and can instead use any size native addressing.

In the preferred embodiment, the shared address space uses large 128 bit virtual addressing to provide single level storage semantics for two-level store systems. Of course the shared address space is not required to be 128 bits, it can be any size large enough to effectively address the needed data using single level store semantics.

In the preferred embodiment, the shared address space 204 is segmented into logical subdivisions. These logical subdivisions facilitate administration of the shared address space by allowing different applications to be assigned different portions of the shared address space. Furthermore, these subdivisions facilitate system administration by allowing system administrators to separately define user rights (e.g., who can read objects, who can create objects, who can write objects, who can allocate space) for each subdivision.

In the preferred embodiment, these subdivisions include cohorts, with each cohort addressing $2^{64}$ bytes, and with each cohort further subdivided into blocks.

To facilitate management of the shared address space 204, a plurality of data structures are provided by the shared persistent virtual storage system 190. These data structures would preferably include cohort data structures for each created cohort, and block data structures for each created block in the cohorts. The cohort data structures would preferably include pointers to block data structures which reside in the corresponding cohort. The block data structures would preferably include the information needed to retrieve data in the corresponding block from data storage 206. For example, in one embodiment each block containing persistent data is stored as a separate file in the file system of data storage 206. In this case, each block data structure would include the name of the file in which the corresponding block is located. When the pager 214 needs to retrieve a page of persistent data from backing store 206 it retrieves the name of the file containing the page from the corresponding block data structure. The shared persistent storage system 190 can then request the required data from the data storage 206 file system using that file name. It should be noted that the preferred embodiment can be adapted to work with any type of data storage system and their associated file systems.

Thus, in the preferred embodiment, when a client process encounters a SAS address, it passes the SAS address to the virtual address translator. The hasher 215 hashes the SAS address and returns a key number n. The key number n is then used to index a hash table to locate a pointer to the page table entry list in the translator lookaside buffer corresponding to that key number. That relatively short list can then be quickly searched for the desired page table entry and the 32-bit address of the data in the page cache. Thus, the hasher 215, the hash table 216 and the translator lookaside buffer 218, are used to quickly locate which page in the page cache, if any, contains the desired information.

As mentioned, Virtual Machine 182 allows the running of interpreted language programs. In the preferred embodiment it comprises a Java Virtual Machine (JVM) 182 for running Java programs.

As mentioned, client process 184 and client process 186 are simply applications running on local machine 202. Shared persistent virtual storage system 190 manages allocations to and deallocations from SAS 204. Persistence mechanism 188 provides the support for the JVM and processes in the JVM to create, store and work with persistent objects stored in the SAS 204.

Figure 3:
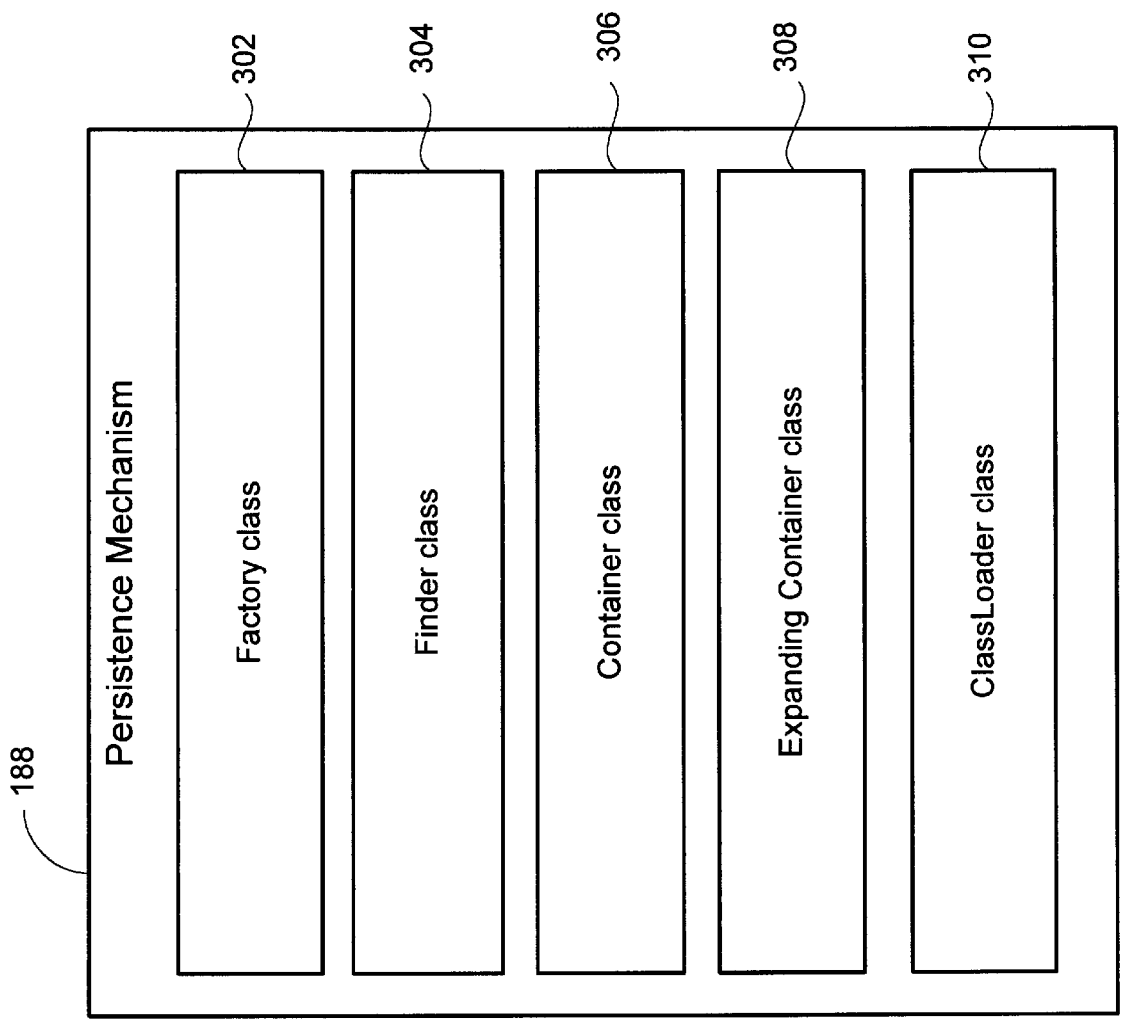
FIG. 3 illustrates a plurality of classes defined by the Persistence Mechanism.

Now referring to FIG. 3, a plurality of classes preferably included in the Persistence mechanism 188 are shown. Specifically, Persistence mechanism 188 includes a Factory class 302, a Finder class 304, a Container class 306, an ExpandingContainer class 308, and a ClassLoader class 310. An application running on a local machine can call methods on Factory class 302 to allocate objects and containers. Factory class 302 is a static class which works in conjunction with instances of Container class 306, ExpandingContainer class 308, and ClassLoader class to create persistent objects. Once an application creates persistent objects, a user can associate names with these persistent objects so that they can be used again when the application restarts. The user can save these names in an instance of Finder class 304.

It will be understood that Factory Class contains all of the methods needed to create persistent objects. Whenever an application wishes to create a persistent object, the application simply makes an appropriate method call on the Factory class. When the Factory class receives the call, the Factory class calls methods on the Container class, the ExpandingContainer class and the ClassLoader class to perform additional functions necessary for creating persistent objects.

Figure 4:
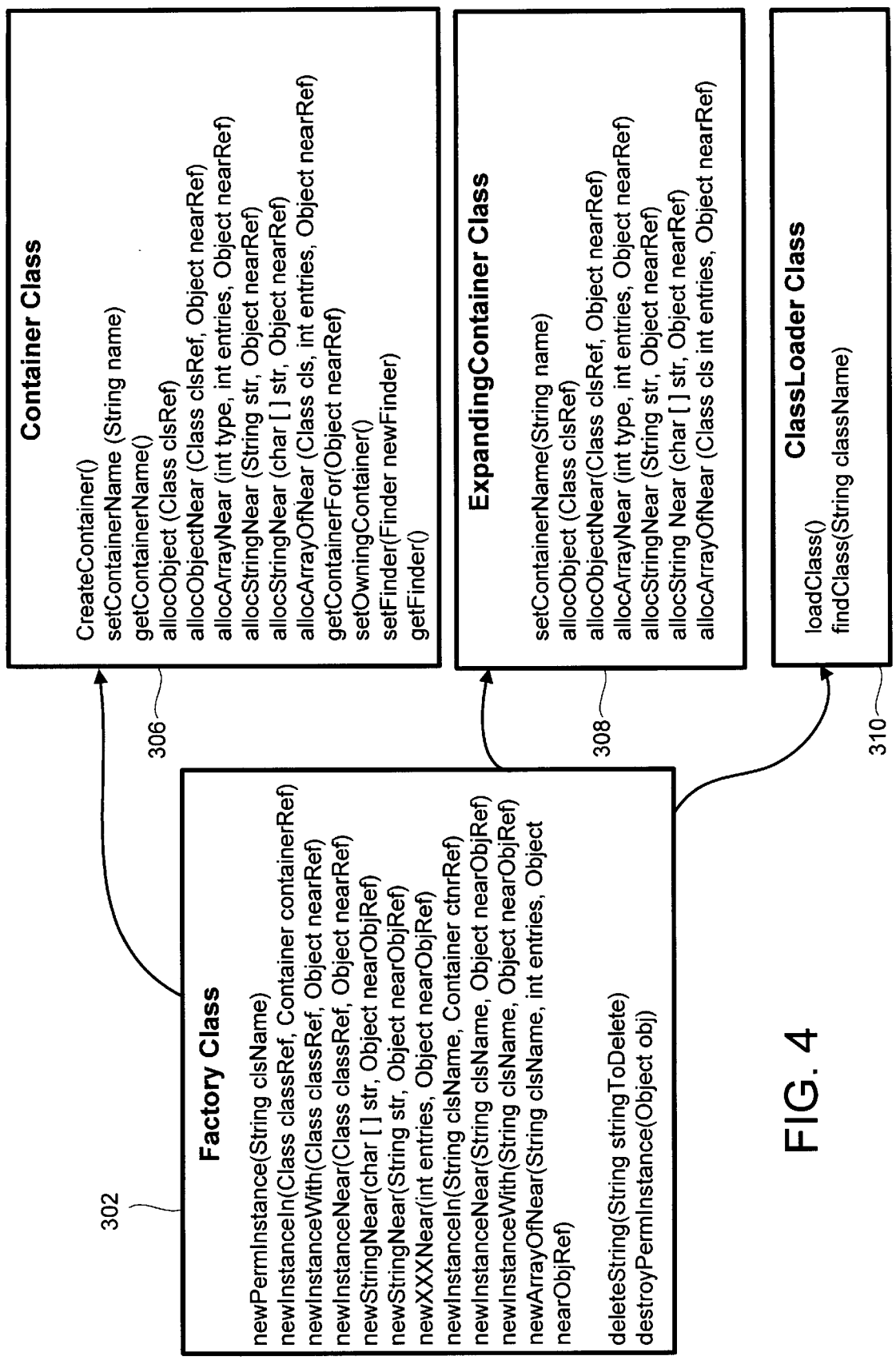
FIG. 4 illustrates the methods defined for the plurality of classes shown in FIG. 3.

Now referring to FIG. 4, the preferred methods defined for Factory class 302 are shown. Factory class 302 is preferably a static JAVA class that applications use to create persistent objects. As shown in FIG. 4, the methods defined for Factory class 302 include: newPermInstance, newInstanceIn, newInstanceWith, newInstanceNear, newStringNear, newByteArrayNear, newShortArrayNear, newIntArrayNear, newLongArrayNear, newFloatArrayNear, newDoubleArrayNear, newBooleanArrayNear, newCharArrayNear, newArrayOfNear, newStringArrayNear, and newObjectArrayNear. All methods beginning with new and ending with ArrayNear are designated in FIG. 4 as newXXXArrayNear.

An application can call method newInstanceIn, newInstanceWith or newInstanceNear on Factory class 302 to create a persistent object. The only difference between these three methods is the location in shared address space (SAS) where the method creates the persistent object. For example, the newInstanceIn method creates a persistent object anywhere in the specified container. Alternately, the newInstanceWith method creates a persistent object in proximity to the specified object. Finally, the newInstanceNear method attempts to create a persistent object within the same SAS page as the specified object. Method newInstanceNear is particularly helpful when two objects are typically brought into memory from SAS at the same time.

The newStringNear method on Factory class 302 creates a persistent string. Specifically, when an application calls method newString, the method copies the string or array of characters passed into the method as a parameter, into persistent memory. Once copied into persistent memory, method newString returns a reference to the persistent string to the application. Once a string is stored persistently, the contents of the string can never be changed since in Java, strings are immutable objects.

Methods newByteArrayNear, newShortArrayNear, newIntArrayNear, newLongArrayNear, newFloatArrayNear, newdoubleArrayNear, newBooleanArrayNear, newCharArrayNear, newArrayOfNear, newStringArrayNear and newObjectArray Near can be called on Factory class 302 by an application to create a new array of a specified type near a specified persistent object. For example, an application can call method newIntArrayNear on Factory class 302 to create a new persistent array of integers near a particular object. The application can specify the number of entries for the array and the object the array is to be located near. Likewise, the other methods create arrays of bytes, shorts, integers, longs, floats, doubles, booleans, characters and objects.

Before any objects can be stored persistently, storage areas for the objects must already be defined within SAS. These storage areas are known as containers. A container is a 16 MB or other size chunk of SAS reserved for storing persistent objects. To create a persistent container, an application explicitly requests creation of a persistent container by calling a method on the Factory class. Once the persistent container is created, objects can be stored persistently within the container. When an application wishes to create a persistent object in a persistent container, Factory class 302 works in conjunction with the methods defined for a particular instance of Container class 306 or ExpandingContainer class 308 to create persistent objects within that persistent container.

Also shown in FIG. 4 are the preferred methods defined for Container class 306: CreateContainer, setContainerName, getContainerName, allocObject, allocObjectNear, allocArraynear, allocStringNear, allocArrayOfNear, getContainerFor, setOwningContainer, setFinder and getFinder( ),. When an application needs to create a persistent Container, Factory class 302 simply calls CreateContainer( ) on Container class 306. CreateContainer then creates an instance of Container class in SAS.

Once an instance of Container class 306 is created, Factory class 302 can call methods allocObject, allocObjectNear, allocArrayNear on the instance of Container class 306 to create persistent objects. Factory class 203 calls methods on an instance of Container class in response to methods called on Factory class 302 by an application. The application requests creation of a persistent object from Factory class 302 and Factory class 302 then makes the calls to the necessary Container object instances to create persistent objects. Factory class 302 can call methods CreateContainer, setContainerName, and getContainerName on the container object to create a persistent container in SAS, name a persistent container in SAS and to retrieve the name of a container from SAS. Factory 302 can also call methods allocStringNear and allocArrayOfNear on the instance of Container class 306 to assist in creating persistent strings and arrays.

Factory class 302 can call the static getContainerFor (Object nearRef) method on container to obtain a reference to a container where the specified object is stored. Factory class 302 specifies an object reference as parameter nearRef and getContainerFor will locate the persistent container where the reference is stored and return a reference to the container. Once the reference to the correct container is returned to Factory class 302, Factory class 302 can then call methods on the correct Container object to create objects within that Container object.

As will be described in more detail below, a name space is an area that correlates a name (specified by the user) to each persistent object that is stored in the container. The application can call setFinder(Finder newFinder) on a particular container object to create a reference to a name space that has been created for the container. An application can then call getFinder on a particular container object to obtain a reference to a name space associated with a container.

As mentioned, a persistent container is preferably a 16 MB chunk of SAS where persistent objects can be stored. If an application creates an instance of the Container class, and the container becomes full, an exception will be returned to the application indicating that the container is full. Once an exception occurs, the application will no longer be able to store data in the container.

In order to allow containers to store more than 16 MB of data, the preferred embodiment defines ExpandingContainer class 308. When an application may need to store more than 16 MB of data into a container, the application will create an instance of the ExpandingContainer class rather than creating an instance of the Container class. An ExpandingContainer will then create as many instances of the Container class as are needed to store data requested by the application. In contrast to an instance of the Container class, an ExpandingContainer class never runs out of storage space. The application creates an ExpandingContainer much in the same way that a Container object is created. Specifically, the application calls newPermInstance on the Factory class and indicates in the parameter that an instance of the ExpandingContainer class is desired.

An ExpandingContainer will create new instances of the Container class each time a container is full and an application needs to store more data. When the application wishes to store data in an ExpandingContainer that has already been created, the ExpandingContainer checks to see whether there is enough room in the current container. If there is not enough room in the current instance of Container, the Container returns an exception to the ExpandingContainer and in response to the exception, the ExpandingContainer creates another instance of the Container class. Once the new instance of the Container class is created, method SetOwning Container is called on the new instance of the Container class to create a reference back to the ExpandingContainer. All instances of the Container class have a reference back to the ExpandingContainer to which they belong. ExpandingContainer continues to create instances of the Container class for data storage as long as the application requests data storage.

The present invention requires the application to determine up front whether a 16 MB Container is large enough to hold all of the data that it will wish to store. For example, if an application creates an instance of the Container class and then the container becomes full and an exception is created, the application cannot then create an instance of the ExpandingContainer class to create additional storage space for the container. Once an application has committed to a regular container, an expanding container cannot be substituted in its place because all of the objects stored in the container already have an address that other objects use to reference the objects stored in the container.

As shown in FIG. 4 the methods defined for ExpandingContainer class 308 are setContainerName, allocObject, allocObjectNear, allocArrayNear, allocStringNear and allocArrayOfNear. These methods perform in the same manner as their namesakes defined for Container class 306. Thus, when the first container is full, the expanding container can be used to store additional data.

Factory class 302 works in conjunction with Container class 306 or ExpandingContainer class 308 to create persistent shared objects in SAS. All applications running on a local computer call methods on Factory class 302 to create persistent objects. Container class 306 and ExpandingContainer class 308 simply contain methods which help the factory create persistent objects. Factory class 308 makes calls on either Container class 306 or ExpandingContainer class 308 depending on whether a container is a regular container or an expanding container.

Also shown in FIG. 4 is a ClassLoader class 310. ClassLoader class contains the following methods: loadClass( ) and findClass( ). Factory Class 302 works in conjunction with ClassLoader class 310 to create persistent objects in SAS. Specifically Factory Class 302 can call findClass( ) on ClassLoader object to look up a class reference using a string denoting the name of a class. Method findClass( ) then returns the class reference to Factory class 302.

While each method has been described generically in respect to the class to which it belongs, each method defined for Factory class 302 works in conjunction with other classes to create persistent objects. When an application makes a request on Factory class, Factory class calls methods on the Container class, the ExpandingContainer class and the ClassLoader class to perform additional functions necessary for creating persistent objects. The following paragraphs describe the calls on Factory class and the subsequent calls by Factory class on Container class, ExpandingContainer class and ClassLoader class.

When an application calls method newPermInstance on Factory class 302, Factory class 302 calls static method CreateContainer( ) on Container class 304. CreateContainer( ) allocates a 16 MB chunk of SAS.

CreateContainer( ) reserves a 16 MB block of SAS and allocates a corresponding 16 MB portion of backing store. CreateContainer then creates a heap in the block. The heap manages allocation of the address space. The container then uses the heap to manage allocations and deallocations within the container.

Method newInstanceIn(Class classRef, Container containerRef) 406 creates a new persistent object in a given container. When an application wishes to create a persistent object in an existing container, the application simply calls method newInstanceIn on the Factory class. The application specifies parameter classRef, the class to be used when creating the new object and parameter containerRef to denote the container in which the new object should be created.

Alternately, an application can call newInstanceIn(String clsName, Container ctnrRef) on Factory class 302 to create a persistent object in a specified persistent container. The only difference between this newInstanceIn method and the one already described is the parameters supplied to the method. Here, newInstanceIn parameter clsName represents the name of a class that the application wishes to create an instance of.

When an application calls newInstanceIn(String clsName, Container cntrRef) on Factory Class 302, method newInstanceIn calls method findClass(String className) on the Classloader object. Method findClass uses the name of the class supplied in the parameter className to obtain a reference to that class. Once method findClass locates the class corresponding to the className parameter, method findClass returns a reference to the class to Factory class 302.

Once Factory class 302 has a reference to the class that the application wishes to create an instance of and a reference to the container where the object should be created, Factory class 302 calls allocObject(Class clsRef) on the container object as specified by the containerRef parameter. Method allocObject then creates an object as specified by the clsRef parameter in the persistent container.

The next method shown in FIG. 4 is newInstanceWith (Class classRef, Object nearRef) which creates a new persistent object in the same container where a first object has already been created. When a process wishes to create a new object in proximity to an object that has already been created, the process simply calls newInstanceWith on the Factory Class. The process specifies parameter classRef to indicate the class of object to be created and parameter nearRef to specify the object in proximity to which the new object should be created. Method newInstanceWith creates a new object in the same container as the object as specified by parameter nearRef. Although method newInstanceWith 408 does not require a reference to a container as a parameter, the method is able to create a new object within a particular container because each object that method newInstanceIn(Class classRef, Container containerRef) creates is within a container. Thus, the reference to an object provided to newInstanceWith is sufficient to allow a new object to be created in a particular container.

An application can also call newInstanceWith(String clsName, Object nearObjRef) to create a new instance of the class as specified by parameter clsName near the object denoted by parameter nearObjRef. When an application calls newInstanceWith(String clsName, Object nearObjRef) on Factory class 302, Factory class 302 calls findClass (String className) on ClassLoader. Method findClass takes the class name as specified by parameter className and finds a corresponding class reference. Method findClass then returns the class reference to Factory class 302.

Once Factory class 302 has a class reference, Factory class 302 calls static getContainerFor(Object nearRef) method on Container class. Method getContainerFor locates the container where the object referenced by nearRef is located and returns a reference to the container to Factory class 302. It should be understood that Factory class 302 must obtain a reference to the container where the application wishes to create a class instance.

Once Factory class 302 has a reference to the desired class, it calls allocObject (Cls clsRef) on the Persistent Container object as indicated by the container reference returned by getContainerFor. Method allocObject asks a heap stored within the Container for a certain amount of storage. Method allocObject searches the free list contained within the heap for an allocation large enough for the requested object. Method allocObject creates an instance of a class as designated by parameter clsRef in the designated spot and returns a reference to the allocation to Factory class 302.

Method newInstanceNear(Class classRef, Object nearRef) creates a new persistent object very close in SAS address space, preferably in the same page, to a particular object. An application can simply call method newInstanceNear(Class classRef, Object nearRef) or method newInstancenear (String clsName, Object nearObjRef) on Factory class 302 and specify parameter classRef to indicate the type of persistent to be created and parameter nearRef to specify a reference to an object. Method newInstanceNear 410 creates an instance of the identified class very close in SAS address space to the object represented by parameter nearRef.

An application can also call newInstanceNear(String clsName, Object nearObjRef) on Factory class 302. The difference between this newInstanceNear method call and the one already described are the parameters supplied to the method. Here, newInstanceNear takes the parameter clsname which contains a string denoting the name of a class. The application is requesting a new instance of the class contained within the string denoted by parameter clsname. When Factory class 203 receives method call newInstancenear(String clsName, Object nearObjRef), it calls method findClass(String className) to locate a class reference corresponding to the name of the class denoted by parameter className. Method findClass then locates the reference corresponding to parameter className and returns the class reference to Factory class 302.

Once the Factory class 302 has the class reference, it calls static method getContainerFor(Object nearRef) on the Container class to create an instance of the class reference. Method getContainerFor locates the container where the object provided by parameter nearRef is stored. Method getContainerFor then returns a reference to the container to Factory class 302.

Method allocObjectNear, would locate the object indicated by parameter nearRef, and then allocate a new object in the same 4096 byte SAS page as the object indicated by reference nearRef, if possible. If there is no SAS space available in the same page for the new object, method allocObjectNear will allocate the new object in the closest available SAS page. Once Factory class 302 has a class reference and an object reference, it calls method allocObjectNear on the persistent container as indicated by the container reference returned by getContainerFor.

An application can call method newStringNear(char [ ] str, Object nearObjRef) or method newStringNear(String str, Object nearObjectRef) to create a new persistent string in memory. The application can specify a character array to be stored persistently as parameter [ ] str and can also specify an object where the string should create the string near using parameter nearObjRef. The application could also supply a character string as parameter str. In Java a string is a Java object which has a reference to a character array. Method newStringNear simply makes a copy of the string contained within the character array or the string into persistent storage located by the object as specified by parameter nearObjRef.

When an application calls newStringNear on Factory class 302, Factory class 302 calls static method getContainerFor(Object nearRef) on Container class. Method getContainerFor will then determine in which container the object indicated by parameter nearRef is stored. Method getContainerFor then returns a reference to the container where the object is located to Factory class 302.

Once Factory class 302 receives the container reference from method getContainerFor, Factory class calls method allocStringNear on the Container object as specified by the container reference returned from getContainerFor. Method allocStringNear creates a copy of the string as indicated by parameter [ ] str or parameter str into persistent storage close to the persistent object as indicated by parameter nearObjRef.

An application can also call method newXXXNear(int entries, Object nearObjRef) on Factory class 302 to create a persistent array of type XXX near the object indicated by parameter nearObjRef. The persistent array can be any one of the following types: byte, short, int, long, float, double, boolean, char or object. For example, an application can call newByteArrayNear(int entries, Object nearObjRef) on Factory class 302 and a new byte array having the number of entries as indicated by parameter entries near the object as indicated by parameter nearObjRef. It should be understood that "XXX" used here is meant to include all of the types that can be used to create a new array.

When Factory class 302 receives a newXXXNear method call, it calls static getContainerFor(Object nearRef) on Container class 306. Method getContainerFor locates the container where the object as specified by parameter nearRef is stored. Method getContainerFor then returns a reference to this container to Factory class 302. Factory class 302 then calls method allocArrayNear(int type, int entries, Object nearRef) on the container as indicated by the container reference returned by method getContainerFor.

Method allocArrayNear creates a new array object of the primitive type indicated by type and with the number of entries as indicated by parameter entries within the same 4096 page as the object designated by parameter nearRef. For example method allocArrayNear could be used to create an array of integers or reals, or any other primitive type that is passed into allocArrayNear as a parameter.

Method newArrayofNear(String clsName, int entries, Object nearObjRef) creates a new array having entries of the type as specified by the first parameter clsName. The first parameter contains a class name indicating the type of array that the method should create. The second parameter represents the size of the array that should be created and the third parameter designates an object reference near which the new array should be created. Thus, an application can create an array of any type by calling method newArrayofNear on Factory class 302. Factory class 302 then calls method getContainerFor on the Container class to determine in which container the object designated by the parameter nearObjRef is stored. Once getContainerFor returns the container reference to Factory class 302, Factory class 302 calls method allocArrayOfNear on the Container instance as designated by the container reference returned to Factory by method getContainerFor.

Method allocArrayOfNear creates an array of objects as specified by a parameter passed to the method. An application can specify the class which the array should contain instances of.

An application can call method deleteString(String stringToDelete) on Factory class 302 to delete a persistent string. Parameter stringToDelete contains the string to be deleted. Method deletestring then deletes the string from SAS.

Method destroyPermInstance(Object obj) can be called on Factory class 302 to deallocate a persistent object. Parameter obj is a reference to the persistent object that the application wishes to delete. It should be understood that a persistent container is also an object, therefore an application can destroy a container by calling destroyPermInstance cand providing a container reference as parameter obj.

An application running on a client machine may create many different persistent objects over its lifetime. When the application terminates, these objects still remain in persistent storage. However, when the application is removed from memory, the application loses track of the persistent objects which it created. Upon restart of the application all of the persistent objects still exist however, the application does not know how to access them. The application could remember an address, however it would be cumbersome to ask a user to enter an address. However, it would be much easier to ask the user for the name of an object. The preferred embodiment provides a Finder class which allows an application to keep track of the persistent objects which it has created by name. When the application restarts, the user can simply enter the names of persistent objects and the finder would be used to find the references corresponding to the names.

Now referring to FIG. 5, a Finder class 502 is shown. Finder class 502 is a name space that maps object names to the actual object reference. Several methods have been defined for Finder class 502: findObjectByName(String name), findNameByObjectID(Object obj), insertObjectByName (String name, Object obj), removeObjectByName (String name), and removeObjectByID(Object obj).

When an application needs to create an instance of Finder class 502 it would call newInstanceIn, newInstanceWith, or newInstanceNear on the Factory class with the parameter Finder. An application can locate a reference to an object using the name of the object by calling findObjectbyName on the Finder object. An application could also look up the name of an object using theobject reference by calling findNameByObjectID on the Finder object. Method findNameByObjectID(Object obj) uses the object reference provided though parameter obj to find out the name of the object corresponding to the object reference. An application can call insertObjectByName(String name, Object obj) to insert an object into the name space. Specifically, the application can specify a string denoting the name of the object using parameter name and also specify the object reference corresponding to the name using parameter obj.

An application can also delete entries from the name space using methods removeObjectByName(String name) and removeObjectByID(Object obj). An application can delete an object in the name space using the name of the object by simply calling removeObjectByName and specifying the name of an object through parameter name. Method removeObjectByName then removes the object from the name space. An application can delete an object in the name space using the reference to the object by simply calling removeObjectByID(Object obj) and specifying the object reference through parameter obj. Method removeObjectByID then removes the object corresponding to the obj parameter from the name space.

Factory Class contains all of the methods needed to create and delete persistent objects. Whenever an application wishes to create a persistent object, the application simply makes an appropriate method call on the Factory class. When the Factory class receives the call, the Factory class calls methods on the Container class, the ExpandingContainer class and the ClassLoader class to perform additional functions necessary for creating persistent objects. Finally, an application can create a Finder object to be able to locate persistent objects upon restart. The application can create the Finder object by making a call on the Factory class.

Thus, the method and apparatus of the preferred embodiment of the present invention can be used to create shared persistent objects. While the invention has been particularly shown and described with reference to a preferred embodiment of the Java programming language, it will be understood by those skilled in the art that the invention is equally applicable to other programming languages. Furthermore, it will be understood that various other changes in form and details may be made therein without departing from the spirit and scope of the invention.

What is claimed is:

1. An apparatus comprising:
  at least one processor;
  a memory coupled to the at least one processor;
  a computer program residing in the memory, the computer program including a persistence mechanism, the persistence mechanism facilitating the creation of at least one persistent object in a persistent container object in a large shared address space on a computer having a relatively smaller native address space when called by the computer program, wherein the at least one persistent object comprises internal data encapsulated by an object interface such that other objects communicate with the at least one persistent object through its interface, and wherein the persistence mechanism provides the ability to store the at least one persistent object with context independent pointers stored within the at least one persistent object as shared address space addresses.

2. The apparatus of claim 1 wherein the persistence mechanism includes a factory class, the factory class including a method for creating the persistent container object in the shared address space.

3. The apparatus of claim 2 wherein the persistent container object comprises a reserved portion of shared address space where an application can store at least one persistent Java object.

4. The apparatus of claim 3 wherein the factory class further includes at least one method for creating at least one persistent object in a persistent container object from the at least one persistent container object in the shared address space.

5. The apparatus of claim 1 further comprising an instance of a classloader class in the persistent container object.

6. The apparatus of claim 5 wherein the instance of the classloader class maintains a list of classes loaded into the persistent container object.

7. The apparatus of claim 5 wherein the classloader class creates a persistent class object for encapsulating class data for the persistent object.

8. The apparatus of claim 7 wherein the persistent container object includes a method that calls a method on an instance of the classloader class to determine if a persistent class object for a specified class has been loaded into the persistent container object.

9. The apparatus of claim 8 wherein the persistent class object encapsulates Java class data within a C++ object.

10. The apparatus of claim 8 wherein the persistent container object calls a method on the instance of the classloader class to load classes into the persistent container object if the persistent class object defining the persistent object has not been loaded into the persistent container object.

11. The apparatus of claim 1 wherein the shared address space facilitates the use of single level store semantics on a 32 bit system such that multiple processes can use context independent addressing.

12. An apparatus comprising:
  at least one processor;
  a memory coupled to the at least one processor;
  a shared address space;
  a persistence mechanism, the persistence mechanism facilitating the creation of at least one persistent object in the shared address space on a computer having a relatively smaller native address space, the persistence mechanism comprising:
    a) a container class, wherein the container class includes a method for creating at least one persistent container object in the shared address space, wherein the at least one persistent container object reserves a portion of the shared address space where an application can store at least one persistent object and wherein the persistent container object contains a plurality of methods for creating the persistent object; and
    b) a factory class, the factory class including a method for calling the container class to create persistent container object in the shared address space.

13. The apparatus of claim 12 wherein the factory class further comprises a method for deleting a persistent container from the shared address space.

14. The apparatus of claim 12 wherein the factory class further includes a plurality of methods for creating at least one persistent object in the persistent container object including a method for calling one of the plurality of methods on the at least one persistent container object to create at least one persistent object in the persistent container object.

15. The apparatus of claim 14 wherein the plurality of methods in the factory class include:
  a) a newInstanceIn method, the newInstanceIn method creating a persistent object in a specified persistent container object in the shared address space;
  b) a newInstanceWith method, the newInstanceWith method creating a persistent object in a specified container object containing a specified persistent object;
  c) a newInstanceNear method, the newInstanceNear method creating a persistent object in very close proximity to a specified persistent object;
  d) a newStringNear method, the newStringNear method creating a persistent string in very close proximity to a specified persistent object; and
  e) a newArrayOfNear method, the newArrayOfNear method creating a persistent array of a specified type in very close proximity to a specified persistent object.

16. The apparatus of claim 12 wherein the plurality of methods in the container object include:
  a) an allocObject method, wherein the allocObject method creates a persistent object in a particular persistent container object;

b) an allocObjectNear method, wherein the allocObjectNear method creates a persistent object in a page in memory which contains a specified persistent object;

c) an allocArrayNear method, wherein the allocArrayNear method creates a persistent array object in a page in memory which contains a specified persistent object;

d) an allocStringNear method, wherein the allocStringNear method creates a persistent string object in a page in memory which contains a specified persistent object; and e) an allocArrayOfNear method, wherein the allocArrayOfNear method creates a persistent array containing entries of a specified type in a page in memory which contains a specified persistent object.

17. The apparatus of claim 16 wherein the plurality of methods in the container object further include a getContainerFor method, wherein the getContainerFor method returns a reference to a persistent container object containing a specified persistent object.

18. The apparatus of claim 13 wherein the persistent container class comprises an expanding container class, wherein a method from a plurality of methods defined for the persistent container class creates a persistent object instance of the expanding container class.

19. The apparatus of claim 13 wherein the method in the factory class for creating a persistent container object in the shared address space further creates an instance of a classloader class in the created persistent container object.

20. The apparatus of claim 19 wherein the classloader class defines a method for determining whether a particular Java class has been loaded into a persistent container object.

21. The apparatus of claim 20 wherein the classloader class further defines a method for loading a Java class into the persistent container object from backing storage.

22. The apparatus of claim 13 wherein the shared address space comprises a 128 bit address space that facilitates the use of single level store semantics on a 32 bit system such that multiple processes can use context independent addressing.

23. A method for creating shared persistent objects in a large shared address space on a computer having a relatively smaller native address space, the method comprising the steps of:

a) creating a persistent container object as defined by a persistent container class in the shared address space, the persistent container object reserving a portion of the shared address space for storing persistent objects; and b) creating a persistent object in the persistent container object.

24. The method of claim 23 wherein the step of creating a persistent object comprises the step of the factory class calling a method on the specified persistent container object to create the persistent object in the persistent container object.

25. The method of claim 23 wherein the step of creating a persistent object comprises creating the persistent object near a specified second persistent object.

26. The method of claim 25 wherein the second persistent object corresponds to a second persistent object already located in a page in the shared address space.

27. The method of claim 23 further comprising the step of creating a second persistent object, wherein the step of creating a second persistent object comprises a factory class calling a method on a persistent container object corresponding to a persistent container reference to create the second persistent object in the persistent container object in a page containing the persistent object.

28. The method of claim 23 further comprising the step of creating a second persistent object in the persistent container containing the persistent object by specifying the a reference for the persistent object.

29. The method of claim 28 wherein the step of creating a second persistent object comprises calling a method on the persistent container class, the method returning a reference of a persistent container object in which the persistent object is located.

30. The method of claim 23 wherein the step of creating the persistent object comprises the step of a factory class calling a method on the persistent container object corresponding to a persistent container reference.

31. The method of claim 23 wherein the step of creating the persistent object comprises the step of the persistent container object calling a method on a persistent classloader object located within the persistent container object to determine if a persistent class object corresponding to the persistent object has been loaded into the persistent container object.

32. The method of claim 31 further comprising the step of the persistent classloader object loading class data for the persistent object into a persistent class object in the persistent container object if the class data has not been previously loaded into the persistent container object.

33. The method of claim 23 wherein the persistent container class comprises a persistent expanding container class.

34. The method of claim 31 wherein the shared address space comprises a 128 bit address space that facilitates the use of single level store semantics on a 32 bit system such that multiple processes can use context independent addressing.

35. A method for creating persistent objects in a large shared address space on a computer having a relatively smaller native address space, the method comprising the steps of:

a) creating a persistent container object as defined by a persistent container class in the shared address space, the at least one persistent container object reserving a portion of the shared address space for storing persistent objects;

b) creating a persistent classloader object in the persistent container, the persistent classloader object managing the at least one persistent container object and loading persistent class objects as needed into the at least one persistent container object;

c) loading a persistent class object into the persistent container object in shared address space; and d) creating a persistent object as defined by the persistent class object in the persistent container object.

36. The method of claim 35 wherein the step of creating a persistent container object comprises the step of calling a method on a factory class requesting creation of at least one persistent container object.

37. The method of claim 35 wherein the step of creating a persistent object comprises creating a persistent object in a container with a specified second persistent object.

38. The method of claim 35 further comprising the step of specifying a second persistent object near which the persistent object is to be created.

39. The method of claim 38 wherein the step of creating the persistent object comprises a factory class calling a method on the persistent container class; the method returning a reference of a persistent container object in which the second persistent object is located.

40. The method of claim 35 further comprising the step of specifying a second persistent object near which the persistent object is to be created, and further comprising the a factory class calling a method on the persistent container object to create the persistent object in the persistent container object within the same page as the second persistent object.

41. The method of claim 35 further comprising the step of calling a method on a persistent classloader object located within the persistent container object to determine if a persistent class object corresponding to the persistent object has previously been loaded into the persistent container object.

42. The method of claim 35 wherein the persistent container class comprises a persistent expanding container class.

43. The method of claim 35 wherein the shared address space facilitates the use of single level store semantics on a 32 bit system such that multiple processes can use context independent addressing.

44. The method of claim 35 wherein the shared address space comprises a 128 bit address space.

45. A program product comprising:
a) a persistence mechanism for creating shared persistent objects in a large shared address space on a computer having a relatively smaller native address space, wherein the persistence mechanism includes a persistent container object as defined by a persistent container class in the shared address space, the persistent container object reserving a portion of the shared address space for storing persistent objects; and wherein the persistence mechanism creates at least one persistent in the persistent container object, and wherein the persistence mechanism provides the ability to store the at least one persistent object with context independent pointers stored within the at least one persistent object as shared address space addresses; and
b) signal bearing media bearing the persistence mechanism.

46. The program product of claim 45 wherein the signal bearing media comprises recordable media.

47. The program product of claim 45 wherein the signal bearing media comprises transmission media.

48. The program product of claim 45 wherein the persistence mechanism includes a factory class, the factory class including a method for creating at least one persistent container object in the shared address space.

49. The program product of claim 45 further comprising an instance of a classloader class in the persistent container object.

50. The program product of claim 49 wherein the instance of the classloader class maintains a list of classes loaded into the persistent container object.

51. The program product of claim 50 wherein the classloader class creates a persistent class object for encapsulating class data for the persistent object.

52. The program product of claim 51 wherein the persistent container object includes a method that calls a method on an instance of the classloader class to determine if the persistent class object for a specified class has been loaded into the persistent container object.

53. The program product of claim 52 wherein a persistent class object encapsulates Java class within a C++ object.

54. The program product of claim 50 wherein the persistent container object calls a method on the instance of the classloader class to load classes into the persistent container object if the persistent class object defining the persistent object has not been previously loaded into the persistent container object.

55. The program product of claim 45 wherein the shared address space facilitates the use of single level store semantics on a 32 bit system such that multiple processes can use context independent addressing.

56. A program product comprising:
A) a persistence mechanism, the persistence mechanism facilitating the creation of at least one persistent object in the shared address space on a computer having a relatively smaller native address space, the persistence mechanism comprising:
  i) a container class, wherein the container class includes a method for creating at least one persistent container object in the shared address space, wherein the at least one persistent container object reserves a portion of the shared address space where an application can store at least one persistent object and wherein the persistent container object contains a plurality of methods for creating the persistent object; and
  ii) a factory class, the factory class including a method for calling the container class to create persistent container object in the shared address space;
B) signal bearing media bearing the persistence mechanism.

57. The program product of claim 56 wherein the signal bearing media comprises recordable media.

58. The program product of claim 56 wherein the signal bearing media comprises transmission media.

59. The program product of claim 56 wherein the factory class further comprises a method for deleting a persistent container from the shared address space.

60. The program product of claim 56 wherein the factory class further includes a plurality of methods for creating at least one persistent object in the persistent container object including a method for calling one of the plurality of methods on the at least one persistent container object to create at least one persistent object in the persistent container object.

61. The program product of claim 60 wherein the plurality of methods in the factory class include:
a) a newInstanceIn method, the newInstanceIn method creating a persistent object in a specified persistent container object in the shared address space;
b) a newInstanceWith method, the newInstanceWith method creating a persistent object in a specified container object containing a specified persistent object;
c) a newInstanceNear method, the newInstanceNear method creating a persistent object in very close proximity to a specified persistent object;
d) a newStringNear method, the newStringNear method creating a persistent string in very close proximity to a specified persistent object; and
e) a newArrayOfNear method, the newArrayOfNear method creating a persistent array of a specified type in very close proximity to a specified persistent object.

62. The program product of claim 56 wherein the plurality of methods in the container object include:
a) an allocObject method, wherein the allocObject method creates a persistent object in a particular persistent container object;
b) an allocObjectNear method, wherein the allocObjectNear method creates a persistent object in a page in memory which contains a specified persistent object;
c) an allocArrayNear method, wherein the allocArrayNear method creates a persistent array object in a page in memory which contains a specified persistent object;

d) an allocStringNear method, wherein the allocString-Near method creates a persistent string object in a page in memory which contains a specified persistent object; and e) an allocArrayOfNear method, wherein the allocArrayOfNear method creates a persistent array containing entries of a specified type in a page in memory which contains a specified persistent object.

63. The program product of claim 62 wherein the plurality of methods in the container object further include a getContainerFor method, wherein the getContainerFor method returns a reference to a persistent container object containing a specified persistent object.

64. The program product of claim 56 wherein the persistent container class comprises an expanding container class, wherein a method from a plurality of methods defined for the persistent container class creates a persistent object instance of the expanding container class.

65. The program product of claim 56 wherein the method in the factory class for creating a persistent container object in the shared address space further creates an instance of a classloader class in the created persistent container object.

66. The program product of claim 56 wherein the classloader class defines a method for determining whether a particular Java class has been loaded into a persistent container object.

67. The program product of claim 66 wherein the classloader class further defines a method for loading a Java class into the persistent container object from backing storage.

68. The program product of claim 56 wherein the shared address space facilitates the use of single level store semantics on a 32 bit system such that multiple processes can use context independent addressing.

69. The program product of claim 68 wherein the shared address space comprises a 128 bit address space.

* * * * *